R. W. ERWIN.
ELECTRIC BATTERY.
APPLICATION FILED NOV. 30, 1915.
1,282,057.
Patented Oct. 22, 1918.
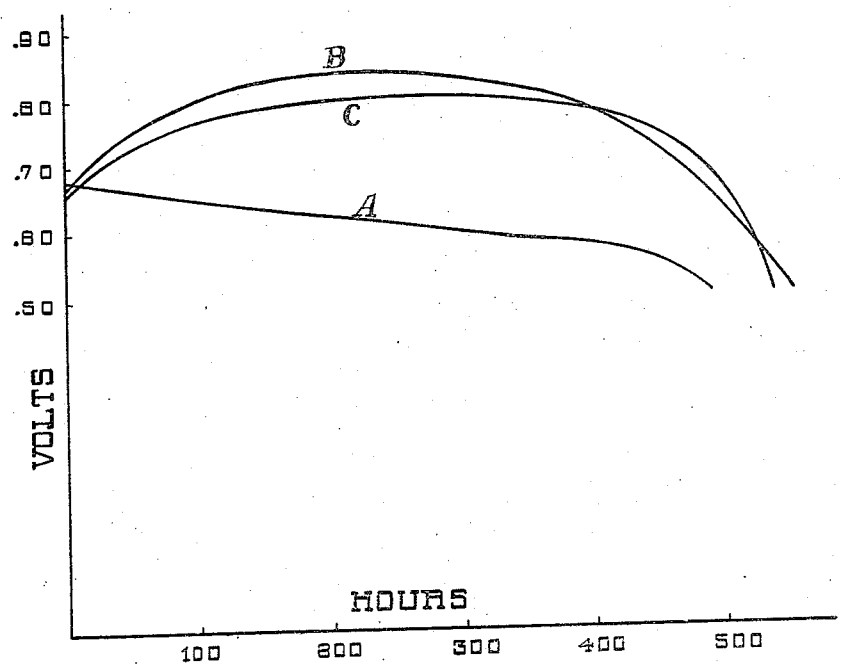
WITNESS
H. G. Grover
INVENTOR.
R. W. ERWIN
BY Ira J. Adams.
ATTORNEY

UNITED STATES PATENT OFFICE.

RAYMOND WILLIAM ERWIN, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

1,282,057.

Specification of Letters Patent.

Patented Oct. 22, 1918.

Application filed November 30, 1915. Serial No. 64,342.

*To all whom it may concern:*

Be it known that I, RAYMOND WILLIAM ERWIN, a citizen of the United States, residing at Fremont, in the county of Sandusky and State of Ohio, have invented a certain new and useful Improvement in Electric Batteries, of which the following is a full, clear, and exact description.

This invention relates to electric batteries. While the improvement is not limited to any particular type, I find it of special value in connection with copper oxid batteries having an alkaline electrolyte.

Referring to the drawings, the single figure graphically represents the voltage characteristics of the cell, the ordinates representing the voltage and the abscissæ the hours of service with a continuous current drain of one ampere.

My invention consists in the use of sulfur in the depolarizing mass and in practice I mix sulfur with the usual flaky copper oxid in a suitable container and oppose the same to a zinc electrode in a potassium or sodium hydroxid electrolyte. This produces a very marked change in the voltage, amounting to an increase of about .2 volt.

To get the beneficial action of the sulfur, it is not necessary to use any definite proportion, as varying amounts are permissible. I have secured good results with from 1 to 5% of sulfur.

Referring especially to the drawing, curve A graphically represents the voltage of the copper oxid cell as usually made; that is, with no sulfur. Curve B represents the voltage of the cell when 1% of sulfur has been incorporated in the copper oxid depolarizing mass. Curve C similarly represents the voltage with 5% of sulfur in the copper oxid mass.

The service life of the cell is substantially increased by the use of sulfur, as is shown by the curves. It is therefore evident that sulfur is a valuable addition to the cell.

Having described my invention, what I claim is:—

1. In a primary battery with alkaline electrolyte, a negative element consisting of a mixture of copper oxid and sulfur.

2. In electric batteries, an alkaline electrolyte, a zinc electrode and a negative element consisting of a mixture of copper oxid and sulfur.

In testimony whereof, I hereunto affix my signature.

R. WILLIAM ERWIN.